United States Patent

Koch-Dücker et al.

[11] Patent Number: 5,727,855
[45] Date of Patent: Mar. 17, 1998

[54] ANTI-LOCKING CONTROL SYSTEM

[75] Inventors: Heinz-Jürgen Koch-Dücker, Sersheim; Peter Dominke, Bietigheim-Bissingen; Martin Pfau, Weissach, all of Germany; Frank Sager, Farmington Hills, Mich.

[73] Assignee: Robert Bosch GmbH, Stuttgart, Germany

[21] Appl. No.: 718,302

[22] PCT Filed: Jan. 12, 1996

[86] PCT No.: PCT/DE96/00036

§ 371 Date: Sep. 20, 1996

§ 102(e) Date: Sep. 20, 1996

[87] PCT Pub. No.: WO96/23682

PCT Pub. Date: Aug. 8, 1996

[30] Foreign Application Priority Data

Feb. 2, 1995 [DE] Germany ............ 195 03 271.3

[51] Int. Cl.⁶ .................... B60T 8/32; G01P 3/48
[52] U.S. Cl. ................... 303/168; 303/172; 303/173; 303/174; 364/426.018
[58] Field of Search ............ 303/121, 171–174, 303/176, 195, 196, 199, 165, 154, 20, 167, 168, 122.02, 122.05, 122.06; 188/181 C; 364/426.018, 426.015, 426.023, 426.021, 571.05, 565; 324/160, 166

[56] References Cited

U.S. PATENT DOCUMENTS

| | | |
|---|---|---|
| 4,358,164 | 11/1982 | Bleckmann et al. ............ 303/195 |
| 4,675,819 | 6/1987 | Fennel ............ 303/173 |
| 4,718,013 | 1/1988 | Kubo ............ 303/195 |
| 4,733,920 | 3/1988 | Pannbacker ............ 303/195 |
| 4,811,232 | 3/1989 | Hoashi et al. ............ 303/168 |
| 4,818,037 | 4/1989 | McEnnan ............ 303/183 |
| 4,989,923 | 2/1991 | Lee et al. ............ 303/173 |
| 4,991,100 | 2/1991 | Matsui . |
| 4,992,730 | 2/1991 | Hagiya . |
| 5,033,799 | 7/1991 | Brasche ............ 303/173 |
| 5,040,120 | 8/1991 | Hoffmann ............ 303/139 |
| 5,116,109 | 5/1992 | Kuwana et al. ............ 303/172 |
| 5,132,907 | 7/1992 | Ishikawa ............ 303/172 |
| 5,173,860 | 12/1992 | Walenty et al. ............ 303/172 |
| 5,185,702 | 2/1993 | Okubo ............ 303/172 |
| 5,210,692 | 5/1993 | Fennel et al. ............ 303/172 |
| 5,233,529 | 8/1993 | Braschel et al. ............ 303/174 |
| 5,277,482 | 1/1994 | Beyer et al. ............ 303/122.06 |
| 5,414,628 | 5/1995 | Yoshino ............ 303/172 |
| 5,428,540 | 6/1995 | Okubo ............ 303/173 |
| 5,430,652 | 7/1995 | Fujioka ............ 303/173 |
| 5,583,773 | 12/1996 | Pfau ............ 303/167 |
| 5,644,490 | 7/1997 | Weber ............ 364/426.018 |

FOREIGN PATENT DOCUMENTS

| | | |
|---|---|---|
| 3925889 | 2/1990 | Germany . |
| 4122484 | 1/1993 | Germany . |
| 9106457 | 5/1991 | WIPO . |
| 9117072 | 11/1991 | WIPO . |

*Primary Examiner*—Douglas C. Butler
*Attorney, Agent, or Firm*—Michael J. Striker

[57] ABSTRACT

An anti-locking control system is described in which the by electrical interference in the range of the mains frequency of conventional power supplies are detected and eliminated. To that end, in the range of critical speeds, a new reference vehicle speed is formed from the ascertained vehicle speed only if the time intervals between the arriving signal edges of the various rpm sensors are not in the range of the mains frequency.

4 Claims, 1 Drawing Sheet

ANTI-LOCKING CONTROL SYSTEM

BACKGROUND OF THE INVENTION

The present invention relates to an anti-locking control system.

In vehicles that are equipped with an anti-locking control system, typically four but in individual cases sometimes only three rpm sensors are used, assigned to the various wheels. The output signals of these rpm sensors generally have a pulse train. From the time interval between individual pulses or pulse edges, the speed of the wheel in rpm is ascertained.

For the anti-locking control system, the reference vehicle speed is also required. This reference vehicle speed is typically ascertained from the four wheel speeds; precisely how the reference vehicle speed is calculated from one or more wheel speeds is known in principle and will therefore not be explained in further detail here.

Since the essential variables from which trigger signals are formed in an anti-locking control system are formed from the aforementioned wheel speed sensors or the associated output signals, reliable monitoring of whether the sensors are functioning properly must be performed. In German patent application P 44 05 801.2, a monitoring system has therefore been proposed which is used in ABS or anti-locking control systems and which makes it possible to detect various malfunctions of the wheel rpm sensors.

In anti-locking control systems, interference signals that approximately correspond to the 50 Hz mains frequency have proved to be problematic. Such interference signals are within a frequency range that proves to be critical in ABS or anti-locking control. Electrical interference from the power supply grid can mean an incorrectly ascertained wheel speed and thus an inadvertent increase in the calculated reference vehicle speed. It is therefore the object of the invention, when such interference signals are present, to detect them and to suppress their effect. The suppression of interference signals should be accomplished without additional components.

SUMMARY OF THE INVENTION

The anti-locking control system according to the invention has the advantage that interference signals that occur at a frequency corresponding to the usual mains frequency are detected and are reliably precluded both in the evaluation of the rpm sensor signals and in the reference vehicle speed formed from these signals.

These advantages are attained in that the reference vehicle speed is determined from the wheel speed signals by a different method at low vehicle speeds than at higher vehicle speeds. At reference vehicle speeds that are below a non-critical threshold, a positive adaptation of the reference vehicle speed is prohibited if signals arrive at at least one wheel rpm sensor in which the time intervals between arriving signal edges are approximately equivalent to the mains frequency. Accordingly, as soon as such time intervals are recorded, a newly ascertained reference vehicle speed is not used if it is higher than the previous value.

Further advantageous features of the invention are attained by means of additional provisions.

DESCRIPTION OF PREFERRED EMBODIMENT

Figure 1:
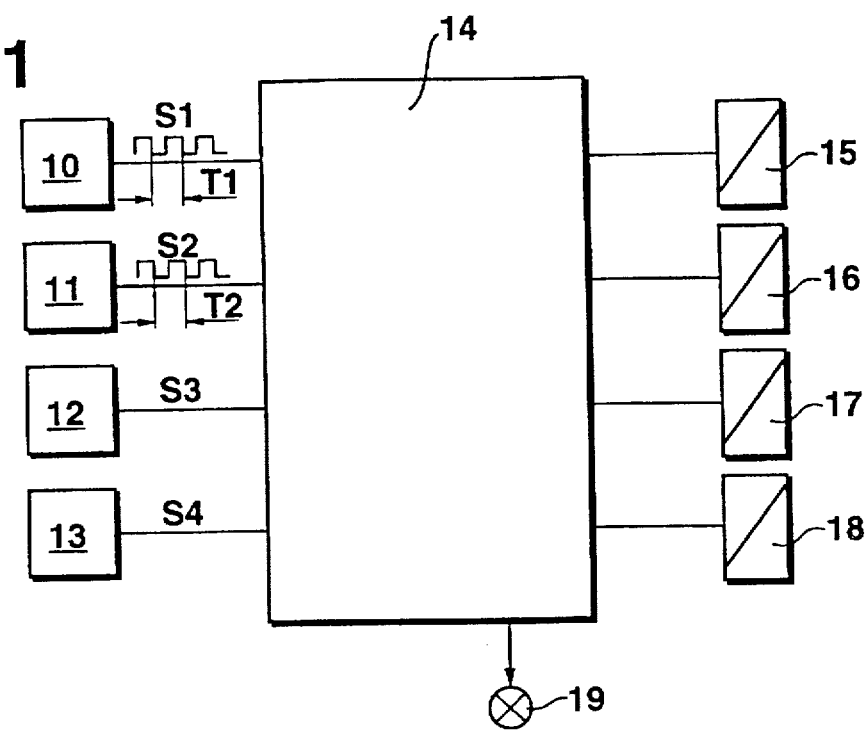
FIG. 1 is a block circuit diagram showing the variables of an anti-locking control system that are essential to understanding the invention.

In FIG. 1, the rpm sensors assigned to the individual wheels are marked 10, 11, 12, and 13. These rpm sensors scan toothed disks, which each rotate in synchronism with one wheel and have a predetermined number of teeth. The rpm sensors furnish the output signals S1, S2, S3, S4. Typically, these signals are a train of pulses. From the time interval between the pulses, or between the same kinds of pulse edges, the wheel speeds or wheel rpms needed for the ABS or anti-locking control are ascertained in the evaluation arrangement 14, typically a microprocessor. The time intervals to be evaluated are designated as T1–T4, for the individual signals S1–S4.

The evaluation arrangement 14 corresponds to the usual evaluation circuits and control units in anti-locking control systems and therefore includes a central processing unit, memories, comparison means, and optionally other logic elements.

The evaluation arrangement 14 evaluates the signals S1–S4. As a function of the wheel speeds ascertained, the evaluation arrangement 14 controls the 3/3-way valves associated with the wheel brakes. If an error is detected, the evaluation arrangement 14 takes the necessary steps and trips a display or indication 19.

Figure 2:
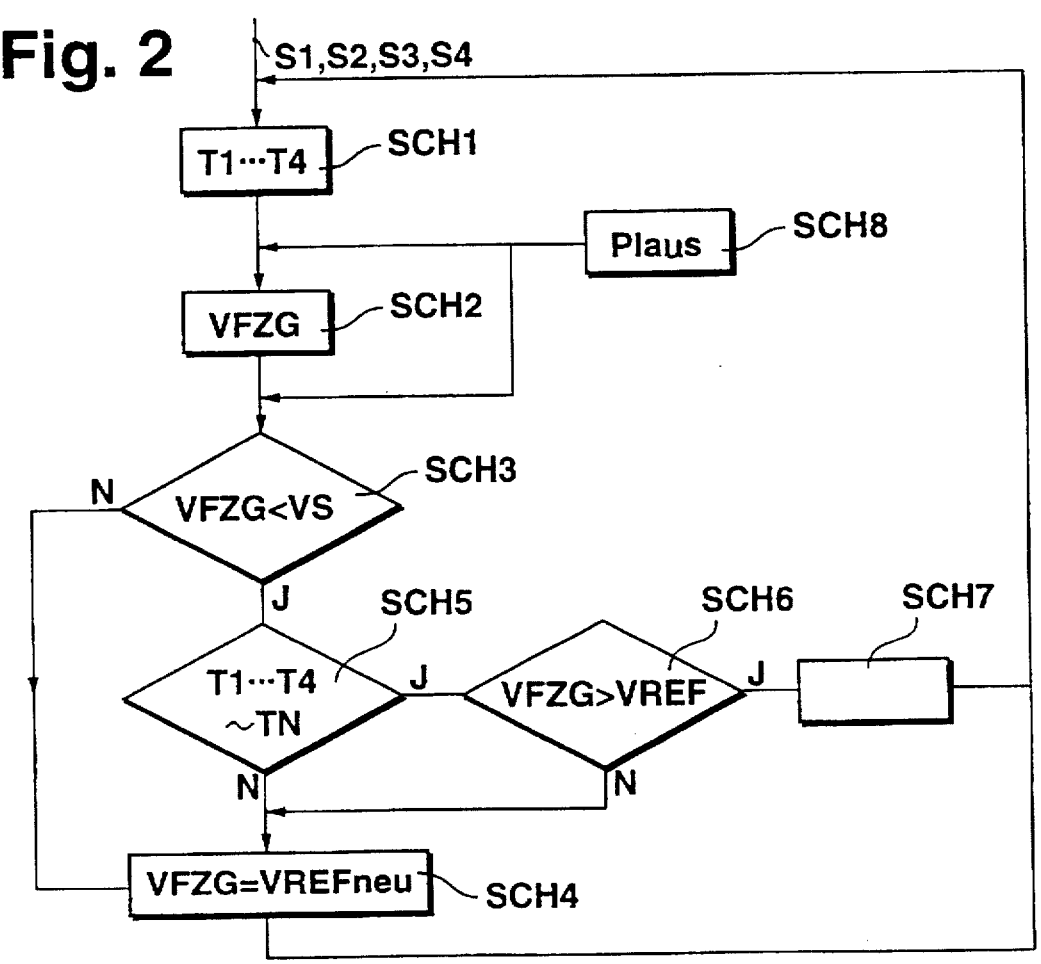
FIG. 2 illustrates one possible method for determining the reference vehicle speed.

Along with the usual evaluations, the method illustrated by FIG. 2 is also executed in the evaluation arrangement 14.

In the method of FIG. 2, the signals S1–S4 are evaluated. In the evaluation arrangement, time intervals between successive edges of the individual signals are each measured. Accordingly, in each program cycle, one time T1–T4 is ascertained for each signal S1–S4. This step is designated as SCH1 in FIG. 2.

In step SCH2, The vehicle speed VFZG is ascertained from these times T1–T4 by one of the known methods. The thus-ascertained vehicle speed VFZG is compared in step SCH3 with a threshold speed VS. The speed threshold is about 5 km/h or from 7–15 km/h, depending on the number of teeth. At higher speeds, conventional anti-locking control systems generally function without problems.

If it is found in step SCH3 that the vehicle speed VFZG ascertained is not below the threshold speed VS, then the current vehicle speed VFZG is used in step SCH4 as the new value, VREFneu, for the reference vehicle speed.

If conversely it is found in step SCH3 that the vehicle speed VFZG is below the threshold speed VS, then in step SCH4 it is asked whether one of the times T1–T4 is approximately in the range of the time TN. This question process in step SCH5 means that it is asked whether at at least one wheel the time intervals of the arriving signal edges are approximately equivalent to the mains frequency, that is, approximately 50 to 60 Hz. The time TN accordingly amounts to about 0.02 to 0.167 seconds.

If it is found in step SCH5 that none of the times T1–T4 are in the range of TN, then the value for the vehicle speed VFZG ascertained in step SCH2 is used in step SCH4 as the new reference vehicle speed VREFneu.

Conversely, if it is found in step SCH5 that at least one of the times T1–T4 is in the range of TN, then it is asked in step SCH6 whether the vehicle speed VFZG ascertained in step SCH3 is greater than the current reference vehicle speed VREF. If the vehicle speed VFZG is not greater than the reference vehicle speed, then the vehicle speed VFZG ascertained in step SCH3 is used as the new reference vehicle speed. Conversely, if the comparison in step SCH6 shows that the vehicle speed VFZG is greater than the reference vehicle speed, then the current value for the vehicle speed is discarded in step SCH7, and the program begins over again at step SCH1 with the evaluation of the next times to occur.

In addition to the program course described thus far, a further plausibility check can be carried out at points that can be selected. This is designated as step SCH8. It can be asked then whether the ascertained times T1–T4 are within plausible limits, and it can also be asked whether the ascertained vehicle speed VFZG is within a plausible range, and values that may be found to be wrong can be discarded and error displays or indications 19 can be tripped.

With the method shown in FIG. 2, it is possible overall to blank out interference signals that have frequencies in the range of the mains frequency. At ascertained vehicle speeds that are above a threshold speed, all the ascertained vehicle speeds are used as the reference vehicle speed. At ascertained vehicle speeds that are below a threshold speed, conversely, a positive adaptation of the reference vehicle speed is prohibited if the time intervals of the arriving signal edges at at least one wheel are approximately equivalent to the mains frequency.

We claim:

1. A method of an anti-locking control of a motor vehicle, comprising the steps of obtaining rpm sensor signals of rpm sensors at wheels of the motor vehicles; forming control signals by using the rpm sensor signals in an evaluation arrangement; ascertaining a reference vehicle speed on ongoing basis from at least one of the rpm sensor signals; predetermining a speed threshold value; comparing the ascertain vehicle speed with the threshold value; at the ascertained vehicle speeds that are greater than the threshold speed using the ascertained vehicle speeds directly as a reference vehicle speed; asking whether time intervals between edges of arriving signals at at least one wheel are approximately equivalent to mains frequency; and in this case using the ascertained vehicle speed as a new reference vehicle speed only if it is less than or equal to the previous reference vehicle speed.

2. A method as defined in claim 1; and further comprising the step of performing plausibility checks to learn whether the rpm sensor signals furnished by the rpm sensors are within a range that is technologically plausible.

3. A method as defined in claim 1; and further comprising the step of tripping an indication if a finding of nonplausibility is made.

4. A method as defined in claim 2; and further comprising the step of tripping a display if a finding of nonplausibility is made.

* * * * *